United States Patent
Haraguchi et al.

(10) Patent No.: US 9,477,882 B2
(45) Date of Patent: Oct. 25, 2016

(54) OBJECT DETECTION APPARATUS

(71) Applicant: MegaChips Corporation, Osaka-shi (JP)

(72) Inventors: Yuki Haraguchi, Osaka (JP); Yujiro Tani, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

(21) Appl. No.: 14/656,919

(22) Filed: Mar. 13, 2015

(65) Prior Publication Data

US 2015/0262363 A1  Sep. 17, 2015

(30) Foreign Application Priority Data

Mar. 13, 2014 (JP) .................................. 2014-050695

(51) Int. Cl.
G06K 9/00 (2006.01)
G06K 9/46 (2006.01)

(52) U.S. Cl.
CPC ....... *G06K 9/00369* (2013.01); *G06K 9/00664* (2013.01); *G06K 9/4609* (2013.01)

(58) Field of Classification Search
CPC .......... G06T 2207/10004; G06T 2207/10016; G06T 2210/22; G06T 7/20; G06K 9/00369; G06K 9/00805; G06K 9/00362; G06K 9/00624; G06K 9/00664; G06K 9/00711; G06K 9/3241
See application file for complete search history.

(56) References Cited

U.S. PATENT DOCUMENTS

| | | | | |
|---|---|---|---|---|
| 6,332,038 B1 * | 12/2001 | Funayama | ............ | G06T 7/0083 348/135 |
| 6,987,534 B1 * | 1/2006 | Seta | ......................... | G01S 11/12 348/229.1 |
| 2009/0226037 A1 * | 9/2009 | Yang | .................. | G06K 9/00369 382/103 |
| 2009/0324059 A1 * | 12/2009 | Boughorbel | .......... | G06T 7/0065 382/154 |
| 2010/0272366 A1 * | 10/2010 | Meng | .................... | G06K 9/6857 382/190 |
| 2012/0008826 A1 * | 1/2012 | Mishra | .................. | G06K 9/6857 382/103 |
| 2014/0219504 A1 | 8/2014 | Haraguchi et al. | | |
| 2014/0294309 A1 | 10/2014 | Haraguchi et al. | | |

FOREIGN PATENT DOCUMENTS

| | | | | |
|---|---|---|---|---|
| JP | 2008-21034 | | 1/2008 | |
| JP | 2009-70344 | | 4/2009 | |
| JP | 2009-070344 | * | 4/2009 | ............... G06T 7/00 |

* cited by examiner

*Primary Examiner* — Amara Abdi
(74) *Attorney, Agent, or Firm* — Oblon, McClelland, Maier & Neustadt, L.L.P.

(57) ABSTRACT

In an object detection apparatus (1), a window setting unit (12) extracts a window (52) from an edge image (22), to thereby generate an ordinary window image (23). When an edge strength of the ordinary window image (23) is not larger than a usage reference value, a used image determination unit (15) determines to use the ordinary window image (23) for calculation of an identification value (30) indicating a degree of presence of a pedestrian in the window (52). When the edge strength of the ordinary window image (23) is larger than the usage reference value, a pixel value correction unit (13) generates a corrected window image (24) having an edge strength smaller than that of the ordinary window image (23) from the ordinary window image (23). When the edge strength of the corrected window image (24) is not larger than the usage reference value, the used image determination unit (15) determines the corrected window image (24) to be used for calculation of the identification value (30).

12 Claims, 16 Drawing Sheets

CORRECTION REFERENCE TABLE 32

|  | ORDINARY WINDOW IMAGE 23 | CORRECTED WINDOW IMAGE 24 (PATTERN 1) | CORRECTED WINDOW IMAGE 25 (PATTERN 2) |
|---|---|---|---|
| CORRECTION REFERENCE VALUE | 0 ₃₃a | 64 ₃₄a | 128 ₃₅a |
| ZERO REFERENCE VALUE | 0 ₃₃b | 63 ₃₄b | 127 ₃₅b |

| | CAPTURED IMAGE 21 | ORDINARY WINDOW IMAGE 23 (EDGE IMAGE 22) | CORRECTED WINDOW IMAGE 24 | CORRECTED WINDOW IMAGE 25 |
|---|---|---|---|---|
| WINDOW 52 |  |  |  |  |
| EDGE STRENGTH | | $W_{1a}$ | $W_{1b}$ | $W_{1c}$ |
| IDENTIFICATION VALUE | | 0.35 | 0.55 | 0.85 |

| | CAPTURED IMAGE 21 | ORDINARY WINDOW IMAGE 23 (EDGE IMAGE 22) | CORRECTED WINDOW IMAGE 24 | CORRECTED WINDOW IMAGE 25 |
|---|---|---|---|---|
| WINDOW 53 | | | | |
| EDGE STRENGTH | | $W_{2a}$ | $W_{2b}$ | |
| IDENTIFICATION VALUE | | 0.65 | 0.95 | |

FIG. 9

| | CAPTURED IMAGE 21 | ORDINARY WINDOW IMAGE 23 (EDGE IMAGE 22) | CORRECTED WINDOW IMAGE 24 | CORRECTED WINDOW IMAGE 25 |
|---|---|---|---|---|
| WINDOW 54 | | | | |
| EDGE STRENGTH | | $W_{3a}$ | $W_{3b}$ | $W_{3c}$ |
| IDENTIFICATION VALUE | | 0.55 | 0.45 | 0.35 |

FIG. 10

CORRECTION REFERENCE TABLE 32

|  | ORDINARY WINDOW IMAGE 23 | CORRECTED WINDOW IMAGE 24 (PATTERN 1) | CORRECTED WINDOW IMAGE25 (PATTERN 2) | CORRECTED WINDOW IMAGE26 (PATTERN3) |
| --- | --- | --- | --- | --- |
| CORRECTION REFERENCE VALUE | 0 | 64 | 128 | 184 |
| ZERO REFERENCE VALUE | 0 | 63 | 127 | 183 |

FIG. 13

| WINDOW 53 | CAPTURED IMAGE 21 | ORDINARY WINDOW IMAGE 23 (EDGE IMAGE 22) | CORRECTED WINDOW IMAGE 24 | CORRECTED WINDOW IMAGE 25 | CORRECTED WINDOW IMAGE 26 |
|---|---|---|---|---|---|
| EDGE STRENGTH | | 34 | 22 | 16 | 8 |
| IDENTIFICATION VALUE | | 0.65 | 0.95 | 0.70 | 0.25 |

FIG. 16A

| WINDOW 54 | CAPTURED IMAGE 21 | ORDINARY WINDOW IMAGE 23 (EDGE IMAGE 22) | CORRECTED WINDOW IMAGE 24 | CORRECTED WINDOW IMAGE 25 | CORRECTED WINDOW IMAGE 26 |
|---|---|---|---|---|---|
| EDGE STRENGTH | | 54 | 45 | 30 | 25 |
| IDENTIFICATION VALUE | | 0.55 | 0.15 | 0.20 | 0.45 |

FIG. 17A

OBJECT DETECTION APPARATUS

BACKGROUND OF THE INVENTION

1. Field of the Invention

The present invention relates to an object detection apparatus, and more particularly to a technique for detecting an object to be detected from a frame image.

2. Description of the Background Art

There are object detection apparatuses each of which determines whether or not there is an object to be detected in an image captured by a camera, or the like. The object detection apparatus is mounted, for example, on a vehicle, together with a camera. The object detection apparatus can notify a driver that there is a pedestrian by determining whether or not there is a human figure in the image captured by the camera. By using the object detection apparatus, the driver can easily grasp the circumstances outside the vehicle.

The object detection apparatus uses pattern matching in order to determine whether or not there is an object to be detected in an image. As an algorithm of the pattern matching, a neural network, a support vector machine, and the like can be used. The object detection apparatus sets a region (window) in which an object is to be detected, in an inputted image. The object detection apparatus determines whether or not the window includes the object to be detected by using a program in which the above algorithm is implemented.

Japanese Patent Application Laid Open Gazettes Nos. 2008-21034 and 2009-70344 each disclose an object detection apparatus using pattern matching.

An apparatus disclosed in Japanese Patent Application Laid Open Gazette No. 2008-21034 detects a pedestrian from an image captured by a vehicle-mounted camera. Specifically, when the apparatus detects a candidate object which has a possibility of being a pedestrian from the image by using a neural network, the apparatus compares the candidate object with a head, limbs, and the like of a pedestrian, to thereby determine whether the candidate object is a pedestrian or not.

An apparatus disclosed in Japanese Patent Application Laid Open Gazette No. 2009-70344 sets a plurality of detection windows having respective regions for detection which partially overlap one another, in an image captured by a camera. The apparatus performs pattern matching on each of the detection windows by using a reference pattern of an object to be recognized (pedestrian or the like). For a region on which the pattern matching is performed a plurality of times, the apparatus integrates the results of a plurality of pattern matching operations. On the basis of the integral result, a position of the pedestrian is specified.

In order to detect an object to be detected from an image, the object detection apparatus using pattern matching learns a pattern of the object to be detected in advance by using an image (sample image data) including the object to be detected. If the object to be detected is a pedestrian, for example, the sample image data is generated by extracting a region including the pedestrian from a learning image in which the pedestrian is imaged. The learning image is captured under a predetermined exposure condition.

The object detection apparatus detects the pedestrian from a captured image inputted from the camera after learning the pattern of the pedestrian. There are some cases, however, where a detection accuracy of the pedestrian becomes lower because of disagreement between an exposure condition under which the captured image is generated and that under which the learning image is generated.

In a case, for example, where the object detection apparatus detects a pedestrian from a captured image taken in the shade while the learning image is generated by capturing an image in a sunny place, since the exposure condition for the captured image is different from that for the learning image, there is a possibility that the object detection apparatus cannot detect any pedestrian though the captured image taken in the shade includes a pedestrian.

Therefore, it is desirable that the captured image should be generated under the same exposure condition as that under which the learning image is generated, in order to improve the accuracy for detecting an object to be detected from a captured image. In such a case, there is a possible method in which the object detection apparatus controls the exposure of the camera in conformity with the exposure condition for the learning image. In this method, the object detection apparatus analyzes the captured image inputted from the camera and feeds the exposure condition back to the camera. If the camera does not accept the exposure condition from the outside, however, this method cannot be used.

SUMMARY OF THE INVENTION

The present invention is intended for an object detection apparatus for detecting an object to be detected from a frame image. The object detection apparatus includes a window setting unit configured to set a window to be used for detection of the object to be detected in the frame image and acquire a first window image having an image of the window, a pixel value correction unit configured to generate a second window image by acquiring a value smaller than a pixel value of a pixel inside the first window image acquired by the window setting unit when the pixel value is smaller than a correction reference value, a feature amount calculation unit configured to calculate a feature amount of the second window image generated by the pixel value correction unit, a used image determination unit configured to determine whether or not to use the second window image for calculation of an identification value indicating whether or not the object to be detected is present in the window on the basis of the feature amount calculated by the feature amount calculation unit, and an identification value calculation unit configured to calculate the identification value indicating a degree of presence of the object to be detected inside the second window image by using feature data of the object to be detected when the used image determination unit determines to use the second window image.

By the present invention, a window image corresponding to any one of various exposure conditions can be acquired from the first window image, and an identification value can be calculated by using the window image corresponding to an optimum exposure condition. It is therefore possible to improve a detection accuracy of an object to be detected.

Therefore, it is an object of the present invention to provide an object detection apparatus capable of improving a detection accuracy of an object to be detected without changing an exposure condition of a camera.

These and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a view showing a plurality of window images corresponding to a window 53 shown in FIG. 4, respective edge strengths corresponding to the window images, and respective identification values calculated from the window images.

FIG. 10 is a view showing a plurality of window images corresponding to a window 54 shown in FIG. 4, respective edge strengths corresponding to the window images, and respective identification values calculated from the window images.

FIG. 13 is a view showing a correction reference table used in the object detection apparatus shown in FIG. 11.

FIG. 16A is a view showing a plurality of window images corresponding to a window 53 shown in FIG. 4, respective edge strengths corresponding to the window images, and respective identification values calculated from the window images;

FIG. 17A is a view showing a plurality of window images corresponding to a window 54 shown in FIG. 4, respective edge strengths corresponding to the window images, and respective identification values calculated from the window images.

DESCRIPTION OF THE PREFERRED EMBODIMENTS

Hereinafter, with reference to figures, the embodiments of the present invention will be described.

[The First Embodiment]

{1 Overall Configuration}

Figure 1:
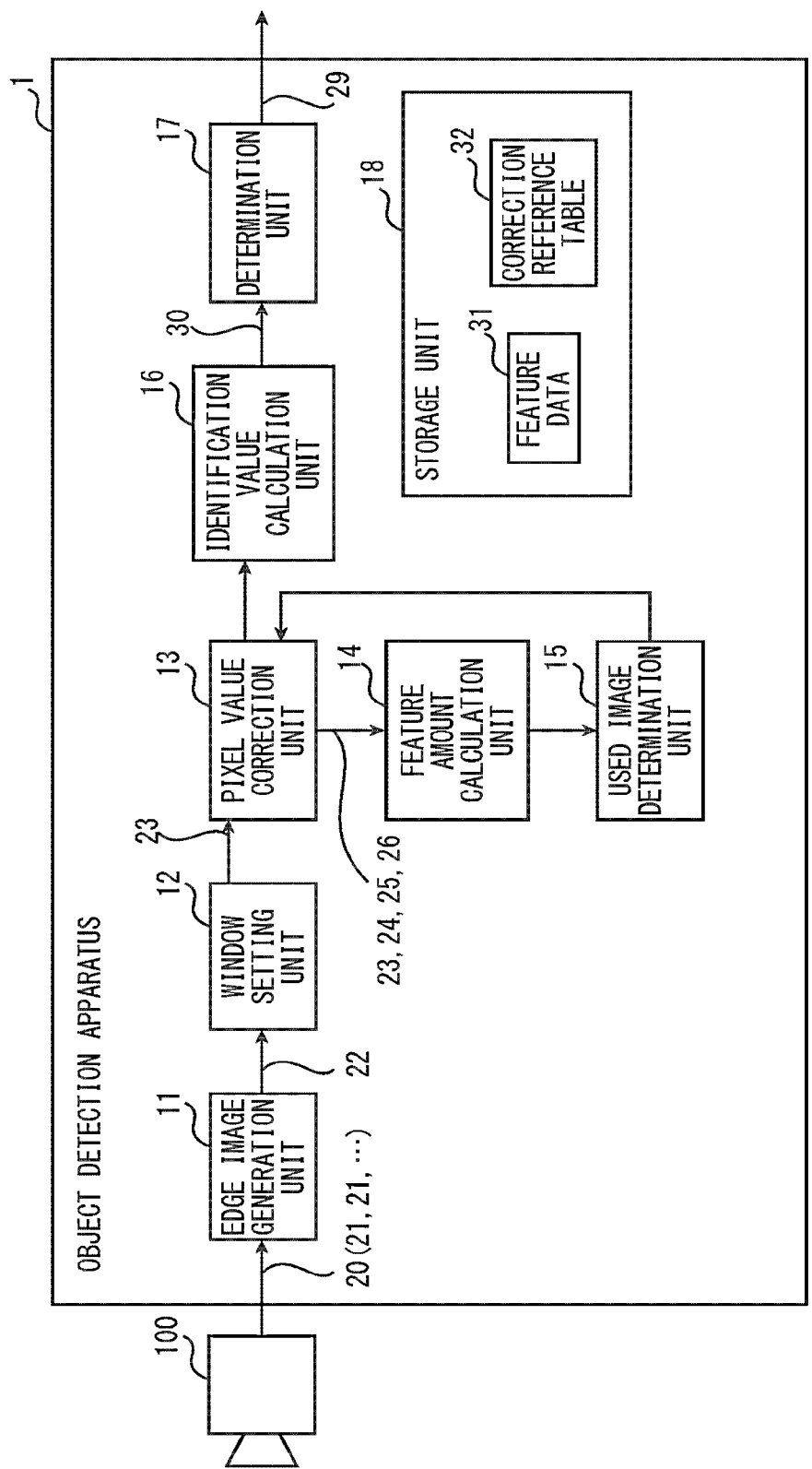
FIG. 1 is a functional block diagram showing a constitution of an object detection apparatus in accordance with a first embodiment of the present invention.

FIG. 1 is a functional block diagram showing an object detection apparatus 1 in accordance with the first embodiment of the present invention. The object detection apparatus 1 detects an object to be detected from a color captured image taken by a camera 100. The object detection apparatus 1 is mounted on a vehicle such as an automobile, together with the camera 100. In this embodiment, the object to be detected is a pedestrian. The object to be detected, however, is not limited to a pedestrian but may be any one of other objects (automobile, road sign, and the like).

The camera 100 is placed on a dashboard of an automobile and captures a landscape in front thereof to generate image data 20. The image data 20 is a moving image consisting of a plurality of frames and is inputted to the object detection apparatus 1 on a frame-by-frame basis. The object detection apparatus 1 determines whether or not there is a pedestrian inside one frame (hereinafter, referred to as a "captured image 21").

As shown in FIG. 1, the object detection apparatus 1 includes an edge image generation unit 11, a window setting unit 12, a pixel value correction unit 13, a feature amount calculation unit 14, a used image determination unit 15, an identification value calculation unit 16, a determination unit 17, and a storage unit 18.

The edge image generation unit 11 converts the captured image 21 into a gray scale image and generates an edge image 22 from the gray scale image. The edge image generation unit 11 performs a processing for enhancement of both an edge extending in a horizontal direction and an edge extending in a vertical direction on the gray scale image, to thereby generate the edge image 22. The edge image 22 is one frame image.

The window setting unit 12 sets a window in the edge image 22 and extracts the window which is set from the edge image 22, to thereby generate an ordinary window image 23. The window is a unit region for detecting a pedestrian from the captured image 21. One ordinary window image 23 is generated for one window.

The pixel value correction unit 13 corrects a pixel value of each pixel inside the ordinary window image 23 on the basis of an instruction from the used image determination unit 15, to thereby generate corrected window images 24 and 25. The pixel value correction unit 13 generates the corrected window images one by one on the basis of the instruction from the used image determination unit 15. In other words, with one instruction from the used image determination unit 15, one corrected window image is generated.

Figures 2, 3:
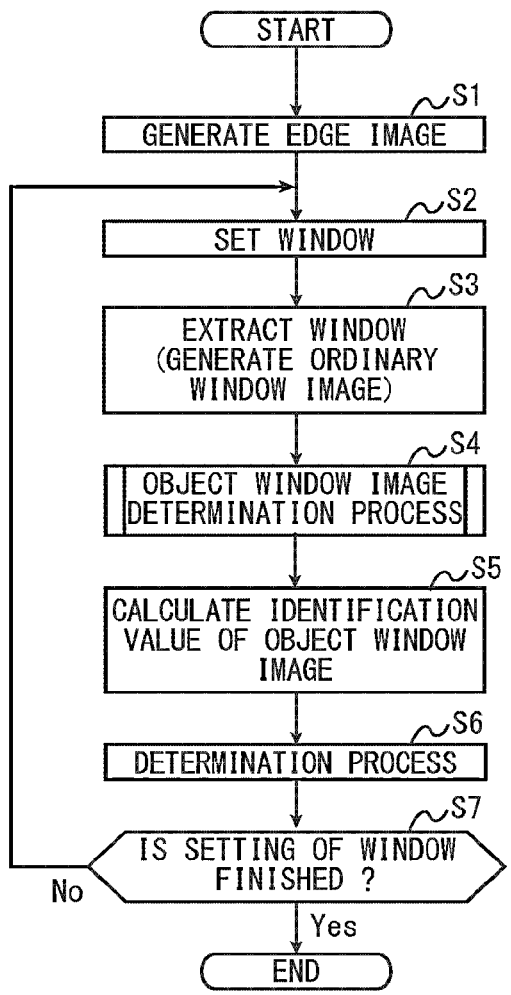
FIG. 2 is a view showing an exemplary correction reference table shown in FIG. 1.
FIG. 3 is a flowchart showing an operation of the object detection apparatus shown in FIG. 1.

FIG. 2 is a view showing an exemplary correction reference table 32 stored in the storage unit 18. In a case of generating the corrected window image 24, the pixel value correction unit 13 compares a pixel value of a pixel included in the ordinary window image 23 with a correction reference value 34a shown in FIG. 2. When the pixel value is smaller than the correction reference value 34a, the pixel value correction unit 13 replaces the pixel value with a value smaller than the original pixel value, to thereby generate the corrected window image 24.

Similarly, the pixel value correction unit 13 generates the corrected window image 25 from the ordinary window image 23 by using a correction reference value 35a. The zero reference value and the correction reference value set for the ordinary window image 23 shown in FIG. 2 will be described later.

Hereinafter, the ordinary window image 23 and the corrected window images 24 and 25 are generally termed "window images 23 to 25". The feature amount calculation unit 14 and the used image determination unit 15 are used to specify an image to be processed by the identification value calculation unit 16 (an image to be used for calculation of an identification value) among the window images 23 to 25.

The feature amount calculation unit 14 acquires the ordinary window image 23 from the pixel value correction unit 13 and calculates an edge strength of the ordinary window image 23. Every time when one corrected window image is generated by the pixel value correction unit 13, the feature amount calculation unit 14 also acquires the corrected window image which is generated. The feature amount calculation unit 14 calculates an edge strength of the acquired corrected window image.

The used image determination unit 15 acquires the edge strength of each window image, which is calculated by the feature amount calculation unit 14, and compares the plurality of edge strengths which are acquired with a threshold value (usage reference value) which is set in advance, respectively. The used image determination unit 15 specifies a window image (object window image) to be used for calculation of an identification value 30 on the basis of the comparison result.

The identification value calculation unit 16 acquires the object window image specified by the used image determination unit 15, from the pixel value correction unit 13. The identification value calculation unit 16 also calculates the identification value 30 by using feature data 31 stored in the storage unit 18. The identification value 30 indicates a degree of presence of a pedestrian inside the object window image. The identification value 30 is a real number not smaller than 0 and not larger than 1. As the identification value 30 becomes closer to 1, the identification value 30 indicates that the probability of a pedestrian being present inside the object window image is higher.

The determination unit 17 determines whether or not there is a pedestrian in the window image set by the window setting unit 12, on the basis of the identification value 30. The determination result is outputted from the determination unit 17 as result data 29.

The storage unit 18 is, for example, a hard disk device, a flash memory, or the like. The storage unit 18 stores the feature data 31 and the correction reference table 32.

{2 Operation of Object Detection Apparatus 1}

FIG. 3 is a flowchart showing an operation of the object detection apparatus 1. Every time when the captured image 21 (frame) is inputted thereto from the camera 100, the object detection apparatus 1 performs an operation shown in FIG. 3, to thereby detect a pedestrian from the inputted captured image 21.

Figure 4:
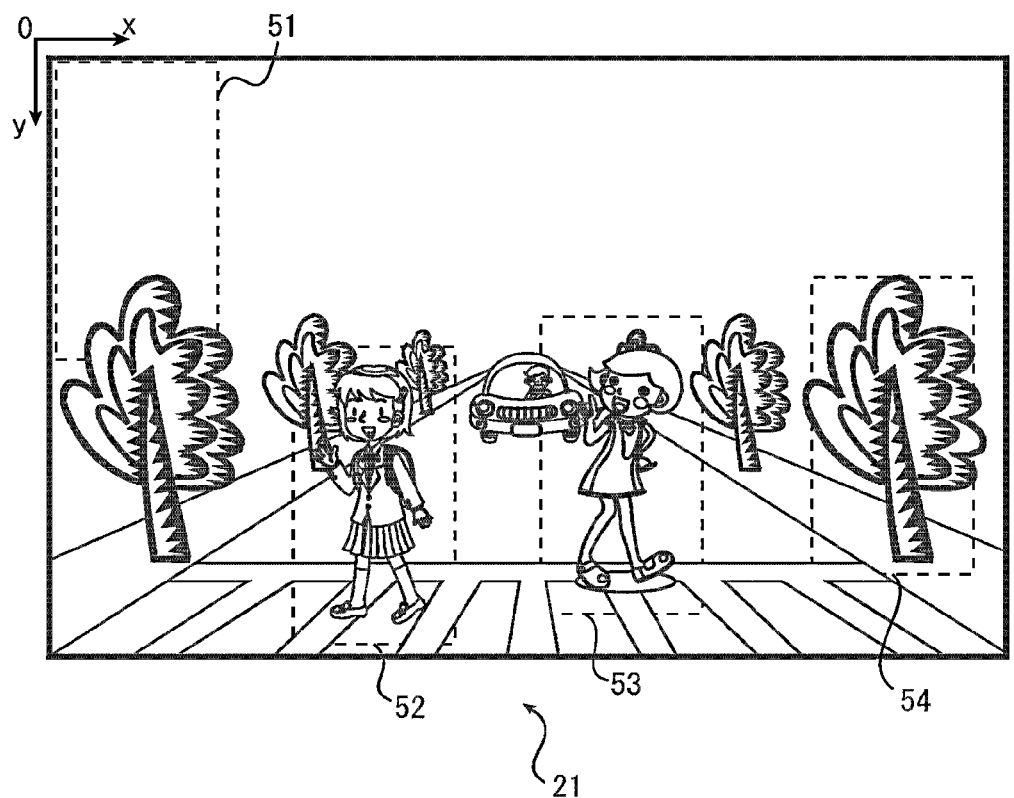
FIG. 4 is a view showing an exemplary captured image inputted to the object detection apparatus shown in FIG. 1.

FIG. 4 is a view showing an exemplary captured image 21 inputted to the object detection apparatus 1. As shown in FIG. 4, the captured image 21 has a coordinate system with the upper-left vertex as an origin point, the transverse direction as x axis, and the longitudinal direction as y axis. Windows 51 to 54 arranged on the captured image 21 are actually set in the edge image 22. For easy-to-understand illustration of respective positions of the windows, the windows 51 to 54 are shown on the captured image 21 shown in FIG. 4.

Hereinafter, the operation shown in FIG. 3 will be described in detail, with a case where the captured image 21 shown in FIG. 4 is inputted to the object detection apparatus 1, taken as an example.

{2.1 Generation of Edge Image}

The edge image generation unit 11 generates the edge image 22 from the color captured image 21 (Step S1). Specifically, the edge image generation unit 11 converts the captured image 21 into a gray scale image and performs an edge enhancement process on the gray scale image. The gray scale image and the edge image 22 each have the same coordinate system as that of the captured image 21. Assuming that a pixel value of each pixel in the gray scale image is f(x, y), the edge image generation unit 11 performs operations expressed by Eqs. (1) to (3) as below, to thereby generate the edge image 22.

Equation 1

$$SobelHorizon(x, y) = \begin{pmatrix} -1 & 0 & 1 \\ -2 & 0 & 2 \\ -1 & 0 & 1 \end{pmatrix} \begin{pmatrix} f(x-1, y-1) & f(x, y-1) & f(x+1, y) \\ f(x-1, y) & f(x, y) & f(x+1, y) \\ f(x-1, y+1) & f(x, y+1) & f(x+1, y+1) \end{pmatrix} \quad (1)$$

Equation 2

$$SobelVerticality(x, y) = \begin{pmatrix} -1 & -2 & -1 \\ 0 & 0 & 0 \\ 1 & 2 & 1 \end{pmatrix} \begin{pmatrix} f(x-1, y-1) & f(x, y-1) & f(x+1, y) \\ f(x-1, y) & f(x, y) & f(x+1, y) \\ f(x-1, y+1) & f(x, y+1) & f(x+1, y+1) \end{pmatrix} \quad (2)$$

Equation 3

$$Sobel(x, y) = SobelHorizon(x, y) + SobelVerticality(x, y) \quad (3)$$

The above Eq. (1) indicates a Sobel filtering process for enhancement of an edge extending in the longitudinal direction. The above Eq. (2) indicates a Sobel filtering process for enhancement of an edge extending in the transverse direction. Eq. (3) indicates that the pixel value of each pixel in the edge image 22 is calculated by addition the calculation result of Eq. (1) and that of Eq. (2).

The edge image generation unit 11 may perform the edge enhancement process by using a process other than the Sobel filtering process.

{2.2 Setting of Window (Step S2)}

The window setting unit 12 inputs therein the edge image 22 generated by the edge image generation unit 11. The window setting unit 12 sets one window to be used for detection of a pedestrian on the edge image 22 inputted thereto (Step S2).

As shown in FIG. 3, by repeating Steps S2 to S7, a plurality of windows rare set for the edge image 22. The window 51 positioned at the upper-left vertex is first set. The window setting unit 12 sets the windows as it scans the captured image 21 from upper left toward lower right. For setting a new window, it is desirable that the window setting unit 12 should set the new window so that the new window may partially overlap an already-set window.

Hereinafter, unless particular description is made, the operation of the object detection apparatus 1 will be described, with the case where the window setting unit 12 sets the window 52, taken as an example.

{2.3 Determination of Object Window Image (Step S4)}

The window setting unit 12 extracts the window 52 from the edge image 22, to thereby generate the ordinary window image 23 (Step S3). The object detection apparatus 1 performs an object window image determination process to determine whether or not each of the window images 23 to 25 can be used for calculation of the identification value 30 (Step S4).

Determination on whether or not to be used for calculation of the identification value 30 is made on the ordinary window image 23, the corrected window image 24, and the corrected window image 25 in this order. The above determination, however, is not necessarily made on all the window images 23 to 25. When the corrected window image 24 is determined to be used for calculation of the identification value 30, the corrected window image 25 is not generated and the above determination is not made thereon. The detail of Step S4 will be described later.

{2.4 Calculation of Identification Value (Step S5)}

The identification value calculation unit 16 calculates the identification value 30 of the window image which is determined to be used for calculation, by using the feature data 31 stored in the storage unit 18. The identification value 30 indicates a degree of presence of a pedestrian in the window image to be used for calculation and is a numerical value not smaller than 0 and not larger than 1. The identification value 30 becomes closer to 1 as the probability of a pedestrian being present inside the window image increases.

The identification value calculation unit 16 uses a neural network as the algorithm for calculation of the identification value 30. The neural network is a kind of pattern matching. Therefore, before starting a process for detecting a pedestrian from the captured image 21 generated by the camera 100, the identification value calculation unit 16 learns the characteristic features of a pedestrian to generate the feature data 31. Hereinafter, generation of the feature data 31 will be described.

Figure 5:
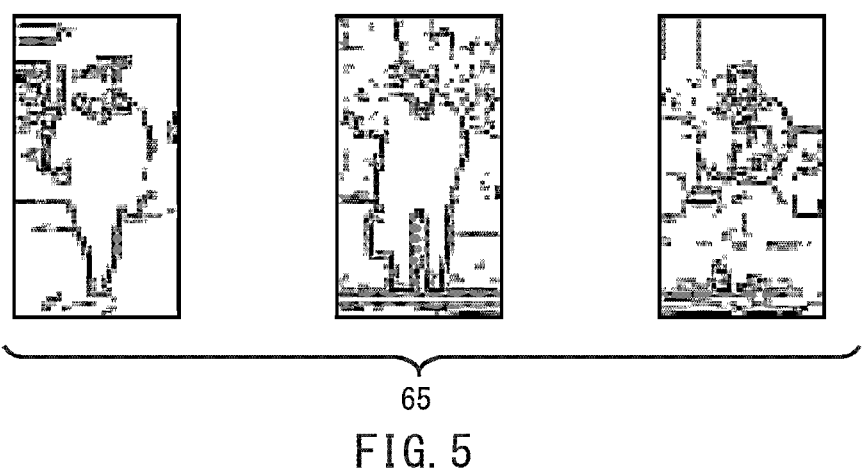
FIG. 5 is a view showing an exemplary sample image data learned by an identification value calculation unit shown in FIG. 1.

FIG. 5 is a view showing an exemplary sample image data 65 which the identification value calculation unit 16 uses for learning about a pedestrian. The sample image data 65 is generated by extracting a region including a pedestrian from the edge image 22 which is generated from the captured image taken for learning. Sizes of the extracted region in the longitudinal and transverse directions are the same as those of each of the windows 51 to 54. It is desirable that the edge strength of the pedestrian in each sample image data 65 should be normalized. "Normalizing the edge strength" refers to "adjusting the edge strength of the pedestrian included in each of the sample image data 65 within a range which is set in advance". In this embodiment, however, it is not prevented for the identification value calculation unit 16 to learn the sample image data 65 which is not normalized.

{2.5 Determination Process (Step S6)}

The determination unit 17 determines whether or not there is a pedestrian inside the window 52 on the basis of the identification value 30 calculated by the identification value calculation unit 16 (Step S6). The determination unit 17 compares the identification value 30 with a boundary value which is set in advance. When the identification value 30 is larger than the boundary value, the determination unit 17 determines that there is a pedestrian inside the window 52 and outputs the result data 29 indicating that there is a pedestrian inside the window 52 in the captured image 21 shown in FIG. 4.

On the other hand, when the identification value 30 is not larger than the boundary value, the determination unit 17 determines that there is no pedestrian inside the window 52. The determination unit 17 outputs the result data 29 indicating that there is no pedestrian inside the window 52 in the captured image 21 shown in FIG. 4.

After outputting the result data 29 corresponding to the window 52, the window setting unit 12 checks if setting of window on the edge image 22 is finished (Step S7). When setting of window is not finished ("No" in Step S7), the process goes back to Step S2 where the window setting unit 12 sets a new window. On the other hand, when setting of window is finished ("Yes" in Step S7), the object detection apparatus 1 finishes the operation shown in FIG. 3. When a new frame (captured image 21) is inputted thereto, the object detection apparatus 1 performs the operation shown in FIG. 3 again.

{3 Detail of Object Window Image Determination Process (Step S4)}

Figure 6:
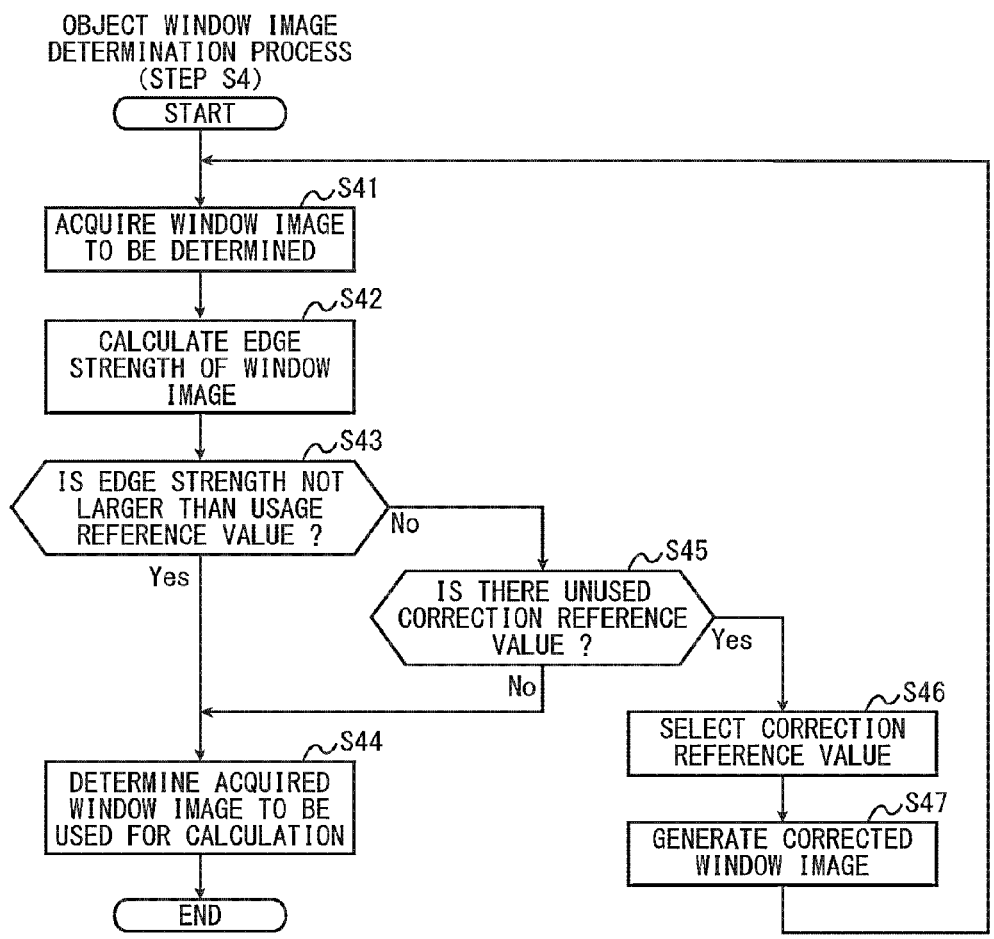
FIG. 6 is a flowchart for an object window image determination process shown in FIG. 3.
Figure 7:
FIG. 7 is a view showing a plurality of window images corresponding to a window 52 shown in FIG. 4, respective edge strengths corresponding to the window images, and respective identification values calculated from the window images.
Figure 7:
Figure 7:
Figure 7:

Hereinafter, with reference to FIGS. 6 and 7, the object window image determination process executed in Step S4 (see FIG. 3) will be described in detail. FIG. 6 is a flowchart for the object window image determination process (Step S4). FIG. 7 is a view showing the window images 23 to 25 corresponding to the window 52, respective edge strengths corresponding to the window images, and respective identification values calculated from the window images. In FIG. 7, the respective identification values 30 corresponding to the ordinary window image 23 and the corrected window image 24 are not actually calculated. For easy comparison among the respective identification values 30 calculated from the window images, however, the identification values 30 corresponding to the ordinary window image 23 and the corrected window image 24 are shown, for the purpose of reference.

{3.1 Determination for Ordinary Window Image 23}

The pixel value correction unit 13 acquires the ordinary window image 23 generated by the edge image generation unit 11 as an object to be determined (Step S41).

The feature amount calculation unit 14 calculates the edge strength of the ordinary window image 23 as the feature amount of the ordinary window image 23 (Step S42). The edge strength can be obtained by calculation expressed by Eq. (4) as below.

Equation 4

$$SumEdge = \frac{1}{NumPixel} \sum_{x=0}^{width} \sum_{y=0}^{height} Edge(x, y) \qquad (4)$$

In the above Eq. (4), Edge(x, y) is a pixel value of each pixel in the ordinary window image 23, with the upper-left vertex of the ordinary window image 23 as the original point. In this embodiment, Sobel(x, y) shown in Eq. (3) is used as Edge(x, y). When the edge image 22 is generated by a process other than the Sobel filtering process (Eqs. (1) to (3)), Edge(x, y) is a pixel value of an image generated by the process other than the Sobel filtering process. "width" represents a size of the ordinary window image 23 in the X-axis direction, and "height" represents a size of the ordinary window image 23 in the Y-axis direction. "NumPixel" represents the number of pixels included in the ordinary window image 23. As shown in Eq. (4), the edge strength of the ordinary window image 23 is obtained by dividing an integrated value of the pixel values of all the pixels inside the ordinary window image 23 by the number of pixels in the ordinary window image 23. In other words, the edge strength is an average value of the pixel value per one pixel in the ordinary window image 23. As shown in FIG. 7, the edge strength of the ordinary window image 23 is represented as W1a.

The used image determination unit 15 compares the edge strength of the ordinary window image 23 with the usage reference value (Step S43). The usage reference value is represented as Wth, which is determined in accordance with the edge strength of the pedestrian included in the sample image data 65. The usage reference value is set in advance in the used image determination unit 15. In other words, the operation of Step S43 is performed to determine whether or not the ordinary window image 23 has an edge strength which is close to the edge strength of the pedestrian included in the sample image data 65. The used image determination unit 15 determines that the edge strength (W1*a*) of the ordinary window image 23 is larger than the usage reference value (Wth) ("No" in Step S43).

In this case, the used image determination unit 15 determines that the ordinary window image 23 is not appropriate to be used for calculation of the identification value 30. Receiving an instruction that ordinary window image 23 is not used for calculation of the identification value 30 from the used image determination unit 15, the pixel value correction unit 13 determines whether or not a corrected window image can be generated.

{3.2 Generation of Corrected Window Image 24}

The pixel value correction unit 13 checks if there is a correction reference value which is not used for generation of a corrected window image, in response to the instruction from the used image determination unit 15 (Step S45).

At this point in time, since neither the corrected window image 24 nor the corrected window image 25 is generated ("Yes" in Step S45), the pixel value correction unit 13 selects the correction reference value 34*a* and the zero reference value 34*b* out of the reference values stored in the correction reference table 32 (Step S46). Specifically, the pixel value correction unit 13 selects the smallest correction reference value 34*a* out of the unused correction reference values 34*a* and 35*a* and the smallest zero reference value 34*b* out of the unused zero reference values 34*b* and 35*b*. Since the correction reference value 33*a* and the zero reference value 33*b* are shown in FIG. 2 for the purpose of reference, these values are not to be selected in Step S46. The reason for this will be described later.

The pixel value correction unit 13 corrects the pixel value of the pixel in the ordinary window image 23 by using the selected correction reference value 34*a* and zero reference value 34*b*, to thereby generate the corrected window image 24 (Step S47). For correction of the pixel value of each pixel in the ordinary window image 23, a coring process is used.

Figure 8:
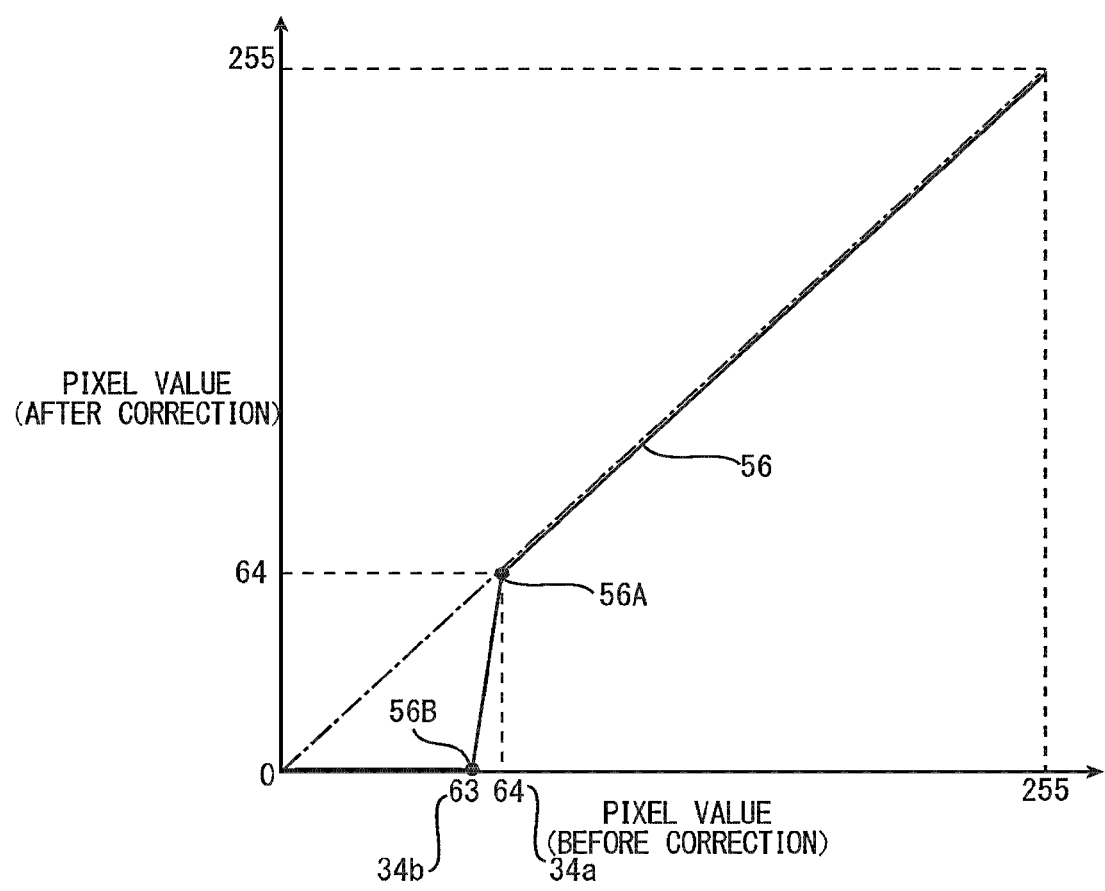
FIG. 8 is a graph showing a reference for correction of a pixel value of a pixel included in an ordinary window image shown in FIG. 7.

With reference to FIG. 8, generation of the corrected window image 24 will be described. FIG. 8 is a graph used for explanation of the coring process for generation of the corrected window image 24. As shown in FIG. 8, in the ordinary window image 23, the maximum value of the pixel value of each pixel is 255 and the minimum value thereof is 0.

In the coring process, two parameters are used. One parameter (correction reference value 34*a*) is used to determine whether the pixel value of the pixel is maintained or the pixel value of the pixel is changed to a value smaller than the current pixel value. The other parameter (zero reference value 34*b*) is used to determine whether or not the original pixel value is set to 0 in the correction of the pixel value.

In FIG. 8, the one-dot chain line represents a pixel value in a case of not performing the coring process. In other words, the one-dot chain line corresponds to a relation between a pixel value before correction and a pixel value after correction in a case where the coring process is performed by using the correction reference value 33*a* and the zero reference value 33*b*. Since the correction reference value 33*a* and the zero reference value 33*b* are each 0, the pixel value after correction is equal to the pixel value before correction. Therefore, the one-dot chain line is a straight line with a gradient of 1. The ordinary window image 23 corresponds to an image obtained by performing the coring process using the correction reference value 33*a* and the zero reference value 33*b* which are each set to 0. Hence, the correction reference value 33*a* and the zero reference value 33*b* shown in FIG. 2 are not to be selected in Step S46.

Further, the correction reference value 33*a* and the zero reference value 33*b* corresponding to the ordinary window image 23 may be each set to a value larger than 0. In this case, the pixel value correction unit 13 corrects the pixel value of the ordinary window image 23 by using the correction reference value 33*a* and the zero reference value 33*b* which are each set to a value larger than 0. The pixel value of the ordinary window image 23 is corrected through the same process as the process to generate the corrected window images 24 and 25 described later. Also when the correction reference value 33*a* and the zero reference value 33*b* are each set to 0, the pixel value correction unit 13 may perform the coring process.

A solid line 56 represents a relation between a pixel value before correction and a pixel value after correction in a case of generating the corrected window image 24. A pixel value before correction corresponding to an inflection point 56A of the solid line 56 is 64, and this value corresponds to the correction reference value 34*a*. A pixel value before correction corresponding to an inflection point 56B is 63, and this value corresponds to the zero reference value 34*b*.

The pixel value correction unit 13 corrects the pixel value of each pixel inside the ordinary window image 23 by using the correspondence represented by the solid line 56. Since the correction reference value 34*a* is 64, the pixel value correction unit 13 determines whether or not the pixel value of a specified pixel inside the ordinary window image 23 is not smaller than 64. When the pixel value of the specified pixel is not smaller than 64, the pixel value of the specified pixel is not changed.

Since the zero reference value 34*b* is 63, the pixel value correction unit 13 determines whether or not the pixel value of the specified pixel is not larger than 63. When the pixel value of the specified pixel is not larger than 63, the pixel value of the specified pixel is corrected to 0.

Since the correction reference value 34*a* is 64 and the zero reference value 34*b* is 63, there is no pixel value which is smaller than the correction reference value 34*a* and larger than the zero reference value 34*b*. The reason for this is that the pixel value takes an integer value not smaller than 0 and not larger than 255. The correction reference value 34*a*, however, may be 100. In this case, a pixel value smaller than the correction reference value 34*a* and larger than the zero reference value 34*b* is corrected on the basis of the correspondence represented by the solid line 56 from the inflection point 56A to the inflection point 56B. Assuming that the pixel value before correction is P, the gradient of the solid line 56 within a range of $63 \leq P < 100$ is larger than 1. Therefore, the pixel value within the range of $63 \leq P < 100$ is corrected to a value larger than 0 and smaller than the original value. Only if the pixel value before correction and the pixel value after correction are in a one-to-one correspondence with each other within the range of $63 \leq P < 100$, the solid line 56 may not be a straight line. Further, the zero reference value may be a value smaller than 63.

{3.3 Determination on Corrected Window Image 24}

The object detection apparatus 1 performs the operation in Steps S41 to S43 on the corrected window image 24 generated by the pixel value correction unit 13.

The feature amount calculation unit 14 acquires the generated corrected window image 24 from the pixel value correction unit 13 (Step S41). The feature amount calculation unit 14 calculates the edge strength of the corrected window image 24 by using Eq. (4) (Step S42). The edge strength of the corrected window image 24 is represented as W1b as shown in FIG. 7.

Since the edge strength (W1b) of the corrected window image 24 is larger than the usage reference value (Wth) ("No" in Step S43), the used image determination unit 15 determines that the corrected window image 24 is not appropriate to be used for calculation of the identification value 30. Receiving the determination result on the corrected window image 24 which is made by the used image determination unit 15, the pixel value correction unit 13 determines whether or not a new corrected window image can be generated.

{3.4 Generation of Corrected Window Image 25}

The pixel value correction unit 13 checks if there is a correction reference value which is not used for generation of a corrected window image, in response to the determination of the used image determination unit 15 (Step S45). At this point in time, since the corrected window image 25 is not generated ("Yes" in Step S45), the pixel value correction unit 13 selects the correction reference value 35a and the zero reference value 35b out of the reference values stored in the correction reference table 32 (Step S46).

As shown in FIG. 2, the correction reference value 35a is 128 and the zero reference value 35b is 127. Like in the generation of the corrected window image 24, the pixel value correction unit 13 corrects the pixel value of the pixel in the ordinary window image 23 by using the selected correction reference value 35a and zero reference value 35b, to thereby generate the corrected window image 25 (Step S47). The feature amount calculation unit 14 acquires the corrected window image 25 generated by the pixel value correction unit 13 (Step S41).

The feature amount calculation unit 14 calculates the edge strength of the corrected window image 25 by using Eq. (4) (Step S42). As shown in FIG. 7, the edge strength of the corrected window image 25 is represented as W1c. Since the edge strength (W1c) of the corrected window image 25 is not larger than the usage reference value (Wth) ("Yes" in Step S43), the used image determination unit 15 determines that the corrected window image 25 should be used for calculation of the identification value 30 (Step S44). This completes the object window image determination process (Step S4) shown in FIG. 6.

Receiving the determination result from the used image determination unit 15, the pixel value correction unit 13 outputs the corrected window image 25 to the identification value calculation unit 16. The identification value calculation unit 16 calculates the identification value 30 indicating a degree of presence of a pedestrian in the corrected window image 25.

Further, when the edge strength (W1c) of the corrected window image 25 is larger than the usage reference value (Wth) ("No" in Step S43), there is neither the correction reference value nor the zero reference value to be used for generation of a new corrected window image ("No" in Step S45). In this case, the used image determination unit 15 determines the corrected window image 25 to be used for calculation of the identification value 30 (Step S44).

Thus, the object detection apparatus 1 determines a window image having an edge strength closest to the usage reference value (Wth) among the window images having an edge strength not larger than the usage reference value (Wth) as the object window image. By using the identification value 30 which is obtained by calculation using the window image which is thus determined, it is possible to improve the detection accuracy of a pedestrian in the window 52. The reason for this will be described below in detail.

When the pixel value P of the ordinary window image 23 is not smaller than the correction reference value 34a, the pixel value correction unit 13 maintains the pixel value P, and when the pixel value P is smaller than the correction reference value 34a, the pixel value correction unit 13 changes the pixel value P to a smaller value, to thereby generate the corrected window image 24. As a result, the edge strength (W1b) of the corrected window image 24 becomes smaller than the edge strength (W1a) of the ordinary window image 23.

Further, the distribution of intermediate pixel values of the corrected window image 24 is narrower than that of intermediate pixel values of the ordinary window image 23. The intermediate pixel value refers to any pixel value other than the minimum pixel value (0) and the maximum pixel value (255). The ordinary window image 23 and the corrected window image 24 have the same difference between the minimum pixel value and the maximum pixel value and different distributions of intermediate pixel values. The ordinary window image 23 has a distribution of intermediate pixel values ranging from 1 to 254. On the other hand, the corrected window image 24 has a distribution of intermediate pixel values ranging from a pixel value larger than the zero reference value 34b by 1 to 254. Since the distribution of intermediate pixel values in the corrected window image 24 is narrower than that of intermediate pixel values in the ordinary window image 23, the brightness difference (contrast) of the corrected window image 24 is sharper than that of the ordinary window image 23.

When the pixel value P of the ordinary window image 23 is not smaller than the correction reference value 35a, the pixel value correction unit 13 maintains the pixel value P, and when the pixel value P is smaller than the correction reference value 35a, the pixel value correction unit 13 changes the pixel value P to a smaller value, to thereby generate the corrected window image 25. As a result, since the correction reference value 35a is larger than the correction reference value 34a, the edge strength (W1c) of the corrected window image 25 becomes smaller than the edge strength (W1b) of the corrected window image 24. Further, since the distribution of intermediate pixel values in the corrected window image 25 is narrower than that of intermediate pixel values in the corrected window image 24, the brightness difference (contrast) of the corrected window image 25 is sharper than that of the corrected window image 24.

Therefore, the window images 23 to 25 have different edge strengths, and the edge strength becomes smaller in the order of the ordinary window image 23, the corrected window image 24, and the corrected window image 25. In other words, by changing the edge strengths of the window images 23 to 25, the respective brightness differences (contrasts) of the window images 23 to 25 can be made different from one another.

Further, the brightness difference (contrast) of the captured image 21 generated by the camera 100 varies in accordance with the exposure condition for shooting. As described above, since the window images 23 to 25 have different brightness differences (contrasts), the window images 23 to 25 correspond to windows extracted from three captured images 21 which are generated under different exposure conditions at the same timing. In other words, the object detection apparatus 1 can generate a plurality of window images corresponding to a plurality of exposure conditions in a pseudo manner, without controlling the exposure condition of the camera 100.

The object detection apparatus 1 compares the respective edge strengths of the window images 23 to 25 with the usage reference value, and specifies a window image to be used for calculation of the identification value 30 on the basis of the comparison result. The usage reference value is determined on the basis of the edge strength of the pedestrian included in the sample image data 65, as described above. As a result, the object detection apparatus 1 can specify a window image having an edge strength which is almost equal to the edge strength of the sample image data 65, out of the window images 23 to 25.

As shown in FIG. 7, among the identification values 30 obtained by calculation using the window images 23 to 25, respectively, the identification value 30 obtained by calculation using the corrected window image 25 which is determined to be used for calculation of the identification value 30 is maximum. Therefore, by determining a window image having an edge strength which is almost equal to the edge strength of the sample image data 65 among the window images 23 to 25 and obtaining the identification value 30 by calculation using the determined window image, it becomes possible to detect a pedestrian included in the window 52 with high accuracy.

Further, it is possible to determine whether or not there is a pedestrian in the windows 53 and 54 by the same method as above.

FIG. 9 is a view showing a relation among the window images 23 to 25 corresponding to the window 53, respective edge strengths of the window images 23 to 25, and respective identification values 30 calculated from the window images 23 to 25. As shown in FIG. 9, in the window 53, the edge strength of the ordinary window image 23 is represented as W2$a$, and the edge strength (W2$a$) is larger than the usage reference value (Wth). In this case, the corrected window image 24 is generated from the ordinary window image 23 of the window 53.

The edge strength of the corrected window image 24 of the window 53 is represented as W2$b$, and the edge strength (W2$b$) is not larger than the usage reference value (Wth). In this case, the used image determination unit 15 determines that the corrected window image 24 is appropriate to be used for calculation of the identification value 30 in the window 53. The identification value calculation unit 16 calculates the identification value 30 from the corrected window image 24. In this case, the corrected window image 25 of the window 53 is not generated.

In detection of a pedestrian in the window 53, though the identification value calculation unit 16 does not calculate identification value 30 from the ordinary window image 23, the identification value 30 calculated from the ordinary window image 23 is shown in FIG. 9 for the purpose of reference. As shown in FIG. 9, the identification value 30 obtained by calculation using the corrected window image 24 is 0.95, which is larger than the identification value (0.65) calculated from the ordinary window image 23. Therefore, it is found in the window 53 that the corrected window image 24 has an edge strength closest to the edge strength of the pedestrian included in the sample image data 65.

FIG. 10 is a view showing a relation among the window images 23 to 25 corresponding to the window 54, respective edge strengths of the window images 23 to 25, and respective identification values 30 calculated from the window images 23 to 25.

As shown in FIG. 10, in the window 54, the edge strength of the ordinary window image 23 is represented as W3$a$, and the edge strength (W3$a$) is larger than the usage reference value (Wth). In this case, the corrected window image 24 is generated from the ordinary window image 23 of the window 54.

The edge strength of the corrected window image 24 of the window 54 is represented as W3$b$, and the edge strength (W3$b$) is larger than the usage reference value (Wth). In this case, the corrected window image 25 is generated from the ordinary window image 23 of the window 54.

The edge strength of the corrected window image 25 of the window 54 is represented as W3$c$, and the edge strength (W3$c$) is not larger than the usage reference value (Wth). In this case, the used image determination unit 15 determines that the corrected window image 25 is appropriate to be used for calculation of the identification value 30 in the window 54. The identification value calculation unit 16 calculates the identification value 30 from the corrected window image 25.

As shown in FIG. 10, in the window 54, the identification value 30 becomes smaller in the order of the ordinary window image 23, the corrected window image 24, and the corrected window image 25. Since the window 54 does not include any pedestrian but includes one tree, by using the identification value 30 obtained by calculation using the corrected window image 25, it is possible to determine that there is no pedestrian in the window 54 with high accuracy.

In order to determine whether or not there is a pedestrian in the window 54, the object detection apparatus 1 compares the respective edge strengths of the window images 23 to 25 with the usage reference value, and specifies the corrected window image 25 to be used for calculation of the identification value 30 on the basis of the comparison result. Since the corrected window image 25 is thereby selected out of the window images 23 to 25, the object detection apparatus 1 can determine that there is no pedestrian in the window 54 with high accuracy.

As described above, the object detection apparatus 1 in accordance with this embodiment determines a window image to be used for calculation of the identification value 30 by comparing the respective edge strengths of the window images 23 to 25 with the usage reference value. Since the difference between the identification value 30 of the window image including a pedestrian and the identification value 30 of the window image including no pedestrian can be thereby made remarkable, it is possible to improve the detection accuracy of a pedestrian.

Further, though the case of using two patterns of combinations of the correction reference value and the zero reference value has been described in this embodiment, only one pattern of combination of the reference values or three or more patterns of combinations of the reference values may be used.

Furthermore, in this embodiment, the case where the usage reference value is a fixed value has been described. The object detection apparatus 1, however, may store a plurality of usage reference values in the storage unit 18 and select one of the usage reference values in accordance with the characteristic feature of the captured image 21. There may be a case, for example, where an integrated value of the pixel values of all the pixels included in the gray scale image generated from the captured image 21 is calculated and the used image determination unit 15 determines the usage reference value to be used, on the basis of the calculated integrated value.

Though the case where the object detection apparatus 1 uses the correction reference value and the zero reference value set in the correction reference table 32 has been described in this embodiment, the present invention is not limited to this. For example, the object detection apparatus 1 may calculate an integrated value of the pixel values of all the pixels included in the gray scale image generated from the captured image 21 and change the correction reference value and the zero reference value set in the correction reference table 32 on the basis of the calculated integrated value.

Though the case where the object detection apparatus 1 determines a window image having an edge strength closest to the usage reference value as the object window image among the window images having edge strengths not larger than the usage reference value has been described in this embodiment, the present invention is not limited to this. For example, the object detection apparatus 1 may determine a window image having an edge strength closest to the usage reference value as the object window image among the window images having edge strengths larger than the usage reference value. Alternatively, the object detection apparatus 1 may determine a window image having an edge strength closest to the usage reference value as the object window image, regardless of whether or not the edge strength of each window image is larger than the usage reference value.

[The Second Embodiment]

{1 Configuration of Object Detection Apparatus 2}

Figure 11:
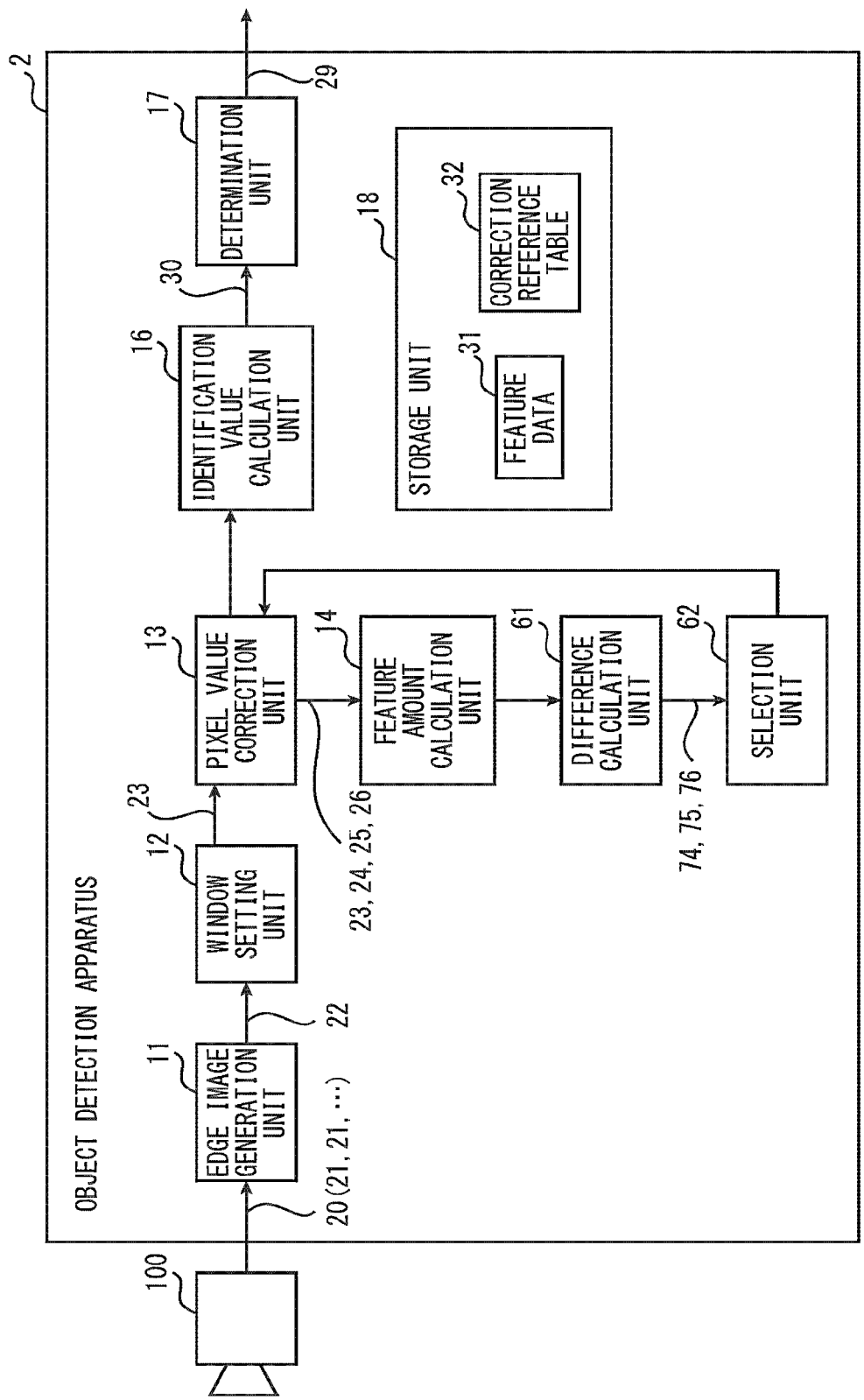
FIG. 11 is a functional block diagram showing a constitution of an object detection apparatus in accordance with a second embodiment of the present invention.

FIG. 11 is a functional block diagram showing an object detection apparatus 2 in accordance with the second embodiment of the present invention. As shown in FIG. 11, the object detection apparatus 2 includes a difference calculation unit 61 and a selection unit 62 instead of the used image determination unit 15. The other constituent elements in the object detection apparatus 2 are identical to those in the object detection apparatus 1. Hereinafter, description will be made on the object detection apparatus 2, centering on the difference from the object detection apparatus 1.

The pixel value correction unit 13 generates the corrected window images 24 to 26 from the ordinary window image 23.

The difference calculation unit 61 calculates differential values 74 to 76. The differential value 74 is obtained by subtracting the edge strength of the corrected window image 24 from the edge strength of the ordinary window image 23. The differential value 75 is obtained by subtracting the edge strength of the corrected window image 25 from the edge strength of the corrected window image 24. The differential value 76 is obtained by subtracting the edge strength of the corrected window image 26 from the edge strength of the corrected window image 25.

The selection unit 62 selects a window image to be used for calculation of the identification value 30 out of the corrected window images 24 to 26, on the basis of the differential values 74 to 76 calculated by the difference calculation unit 61.

{2 Operation of Object Detection Apparatus 2}

Figure 12:
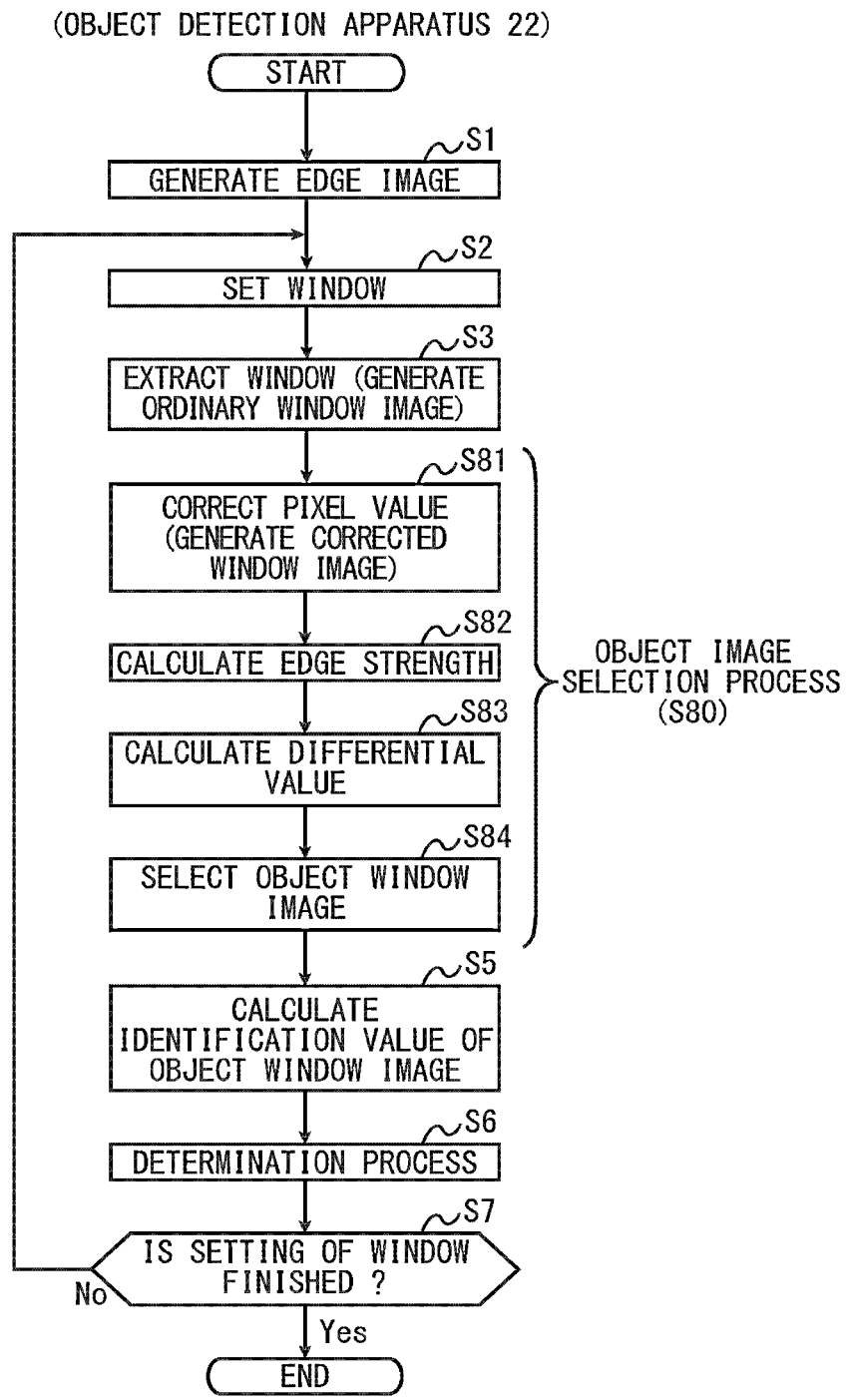
FIG. 12 is a flowchart showing an operation of the object detection apparatus shown in FIG. 11.

FIG. 12 is a flowchart showing an operation of the object detection apparatus 2. Hereinafter, unless particular description is made, the operation of the object detection apparatus 2 will be described, with the case where a pedestrian is detected from the window 52 (see FIG. 4), taken as an example.

In the object detection apparatus 2, the edge image generation unit 11 generates the edge image 22 from the captured image 21 (Step S1). The window setting unit 12 sets the window 52 on the edge image 22 (Step S2), and extracts the window 52 from the edge image 22, to thereby generate the ordinary window image 23 (Step S3). Since the operation in Steps S1 to S3 in this embodiment is the same as that in the first embodiment, detailed description thereof will be omitted.

The object detection apparatus 2 selects a window image (object window image) to be used for calculation of the identification value 30 out of the corrected window images 24 to 26 (Step S80). The detail of Step S80 will be described later, and hereinafter, description will be made, taking a case where the corrected window image 24 is selected, as an example.

The pixel value correction unit 13 outputs the corrected window image 24 selected by the selection unit 62 to the identification value calculation unit 16. The identification value calculation unit 16 calculates the identification value 30 indicating a degree of presence of a pedestrian in the corrected window image 24, by using the feature data 31 (Step S5). The determination unit 17 determines whether or not there is a pedestrian inside the window 52, on the basis of the identification value 30 calculated by the identification value calculation unit 16 (Step S6).

The window setting unit 12 checks if setting of window on the edge image 22 is finished (Step S7). When setting of window is not finished ("No" in Step S7), the process goes back to Step S2 where the window setting unit 12 sets a new window. On the other hand, when setting of window is finished ("Yes" in Step S7), the object detection apparatus 2 finishes the operation shown in FIG. 12.

Since the operation in Steps S5 to S7 shown in FIG. 12 is the same as that in the above-described first embodiment, detailed description thereof will be omitted.

{3 Object Image Selection Process (Step S80)}

Hereinafter, with reference to FIGS. 12 and 13, an object image selection process (Step S80) will be described in detail.

FIG. 13 is a view showing an exemplary correction reference table 32 used in this embodiment. The pixel value correction unit 13 acquires the ordinary window image 23 from the window setting unit 12. The pixel value correction unit 13 generates the corrected window images 24 to 26 from the ordinary window image 23 by using the correction reference values and the zero reference values which are set in the correction reference table 32 shown in FIG. 13 (Step S81). The corrected window images 24 to 26 are generated by the method described in the first embodiment.

In the above-described first embodiment, since the pixel value correction unit 13 generates the corrected window images in response to the determination of the used image determination unit 15, the corrected window image 24 or 25 is not generated in some cases. In this embodiment, however, the pixel value correction unit 13 generates all the corrected window images 24 to 26.

As shown in FIG. 13, in the correction reference table 32, set are three patterns (pattern 1 to pattern 3) of combinations of the correction reference value and the zero reference value. For the purpose of reference, the combination of the correction reference value and the zero reference value corresponding to the ordinary window image 23 is shown in FIG. 13. The correction reference value increases by 64 as the pattern number becomes larger. The zero reference value is smaller than the correction reference value by 1.

Figure 14A:
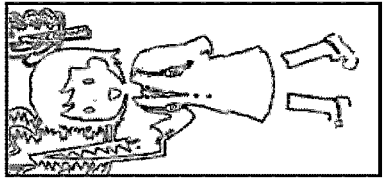
FIG. 14A is a view showing a plurality of window images corresponding to a window 52 shown in FIG. 4, respective edge strengths corresponding to the window images, and respective identification values calculated from the window images.

FIG. 14A is a view showing the window images 23 to 26 corresponding to the window 52, respective edge strengths of the window images 23 to 26, and respective identification values 30 calculated from the window images 23 to 26. Actually, as described later, the identification value 30 is calculated from the corrected window image 24 and is not calculated from other window images.

The feature amount calculation unit 14 calculates the respective edge strengths of the window images 23 to 26 (Step S82). The operation of Step S82 is the same as that of Step S42 shown in FIG. 6.

The difference calculation unit 61 calculates the differential values 74 to 76 by using the respective edge strengths of the window images 23 to 26 (Step S83). The differential value 74 is a difference between the edge strength of the ordinary window image 23 and that of the corrected window image 24. The differential value 75 is a difference between the edge strength of the corrected window image 24 and that of the corrected window image 25. The differential value 76 is a difference between the edge strength of the corrected window image 25 and that of the corrected window image 26. The difference calculation unit 61 arranges the window image 23 to 26 in decreasing order of edge strength and calculates the differential value of the edge strengths of the two adjacent window images.

The selection unit 62 selects a window image (object window image) to be used for calculation of the identification value among the corrected window images 24 to 26 on the basis of the differential values 74 to 76 (Step S84). The selection unit 62 determines that the differential value 74 is largest among the differential values 74 to 76. Then, the selection unit 62 selects the corrected window image 24 having a smaller edge strength among two edge strengths used for calculation of the differential value 74, as the object window image.

Figure 14B:
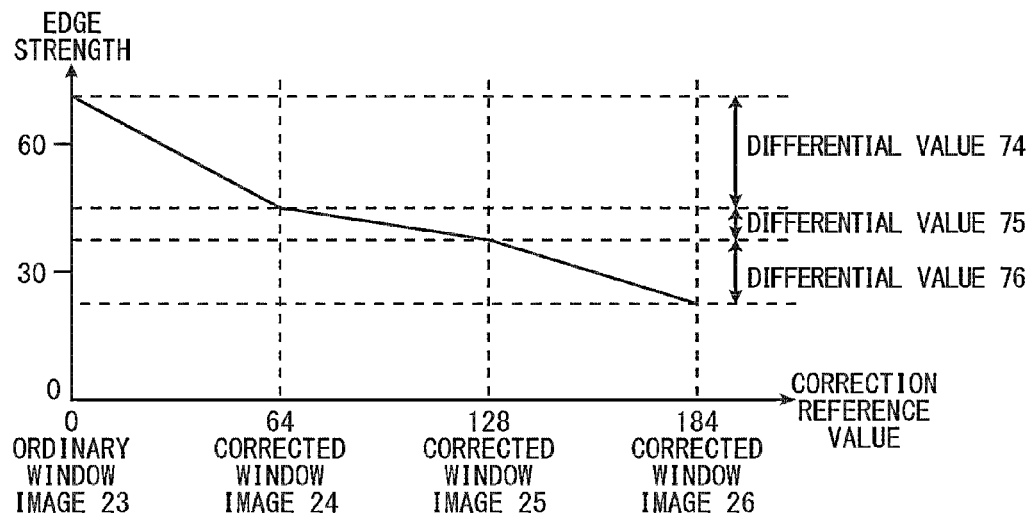
FIG. 14B is a graph showing a change in the edge strength shown in FIG. 14A.

FIG. 14B is a graph showing a change in the edge strength among the window images of the window 52. In FIG. 14B, the horizontal axis represents the correction reference value and the vertical axis represents the edge strength. Since the pixel whose pixel value is corrected to 0 increases as the zero reference value becomes larger, the edge strength becomes smaller in the order of the ordinary window image 23, the corrected window image 24, the corrected window image 25, and the corrected window image 26.

Further, the differential value 74 is largest among the differential values 74 to 76. As shown in FIG. 14A, in the window 52, the ordinary window image 23 includes many fine edges as well as the edge indicating the contour of a pedestrian. On the other hand, the corrected window image 24 does not include the fine edges which appear in the ordinary window image 23. In other words, in generation of the corrected window image 24 corresponding to the largest differential value 74, many of components other than an object to be detected (pedestrian) are cancelled. Therefore, it is determined that the corrected window image 24 is optimum for detection of a pedestrian in the window 52.

Figure 15:
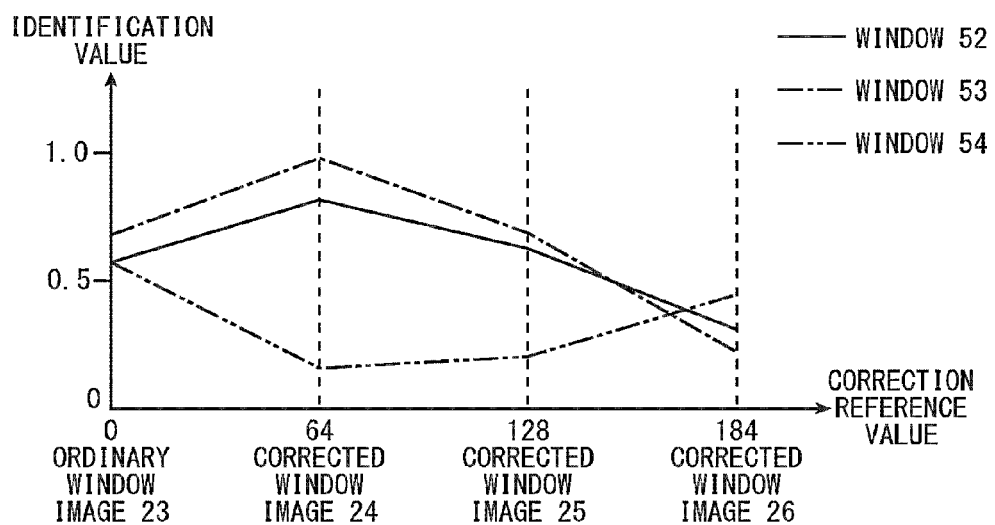
FIG. 15 is a graph showing a change in the identification value shown in FIG. 14A.

FIG. 15 is a graph showing a result of calculation of the identification values 30 in each of the windows 52 to 54. The result of calculation of the identification values 30 in each of the windows 53 and 54 will be described later. As described above, in the window 52, a window image to be used for calculation of the identification value 30 is the corrected window image 24, and the identification values 30 of the ordinary window image 23 and the corrected window images 25 and 26 are not actually calculated.

As shown in FIG. 15, in the window 52, the identification value 30 calculated from the corrected window image 24 forms a peak. Though the window images 23 to 26 each include a pedestrian, the identification values 30 calculated from the window images 23 to 26 are different from one another. The fact that the identification value 30 of the corrected window image 24 is largest among the window images 23 to 26 means that the corrected window image 24 has an edge strength closest to the edge strength of the sample image data 65 among the window images 23 to 26.

As described in the above first embodiment, since the window images 23 to 26 have different brightness differences (contrasts), the window images 23 to 26 correspond to windows extracted from four captured images 21 which are generated under different exposure conditions at the same timing. In other words, the object detection apparatus 2 can generate a plurality of window images corresponding to a plurality of exposure conditions in a pseudo manner, without controlling the exposure condition of the camera. By performing selection among the corrected window images 24 to 26 on the basis of the differential values 74 to 76 (Step S84), the object detection apparatus 2 can control the exposure condition in the generation of the captured image 21 shown in FIG. 4 in conformity with the exposure condition in the generation of the sample image data 65 in a pseudo manner. Therefore, the object detection apparatus 2 can improve the detection accuracy of a pedestrian in the captured image 21, like the object detection apparatus 1.

Next, selection of the object window image of the window 53 will be described. The selection of the object window image of the window 53 is also performed in the same manner as above.

Figure 16B:
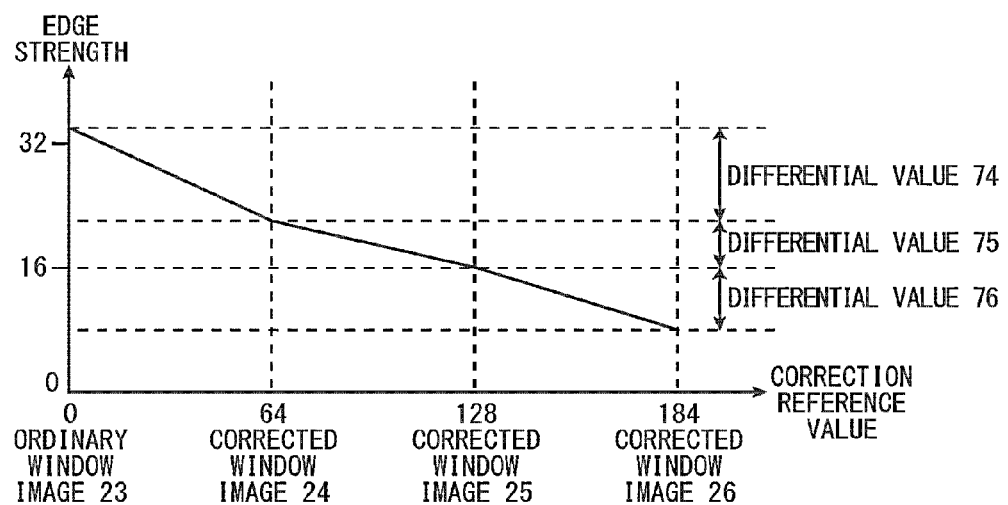
FIG. 16B is a graph showing a change in the edge strength shown in FIG. 16A.

FIG. 16A is a view showing the window images 23 to 26 corresponding to the window 53, respective edge strengths of the window images 23 to 26, and respective identification values 30 calculated from the window images 23 to 26. FIG. 16B is a graph showing a change in the edge strength among the window images of the window 53.

As shown in FIGS. 16A and 16B, the respective edge strengths of the window images 23 to 26 decrease as the correction reference value and the zero reference value become larger. In the window 53, the differential value 74 is largest among the differential values 74 to 76. As a result, it is determined that a window image to be used for calculation of the identification value 30 in the window 53 is the corrected window image 24.

As shown in FIG. 15, in the window 53, the identification value 30 calculated from the corrected window image 24 is larger than the identification values 30 calculated from the other window images and forms a peak. Therefore, it is found that the detection accuracy of a pedestrian can be improved by determining whether or not there is a pedestrian in the window 53 with the identification value 30 calculated from the corrected window image 24.

Next, selection of the object window image of the window 54 will be described. The selection of the object window image of the window 54 is also performed in the same manner as above. As shown in FIG. 4, there is no pedestrian and only a tree in the window 54.

Figure 17B:
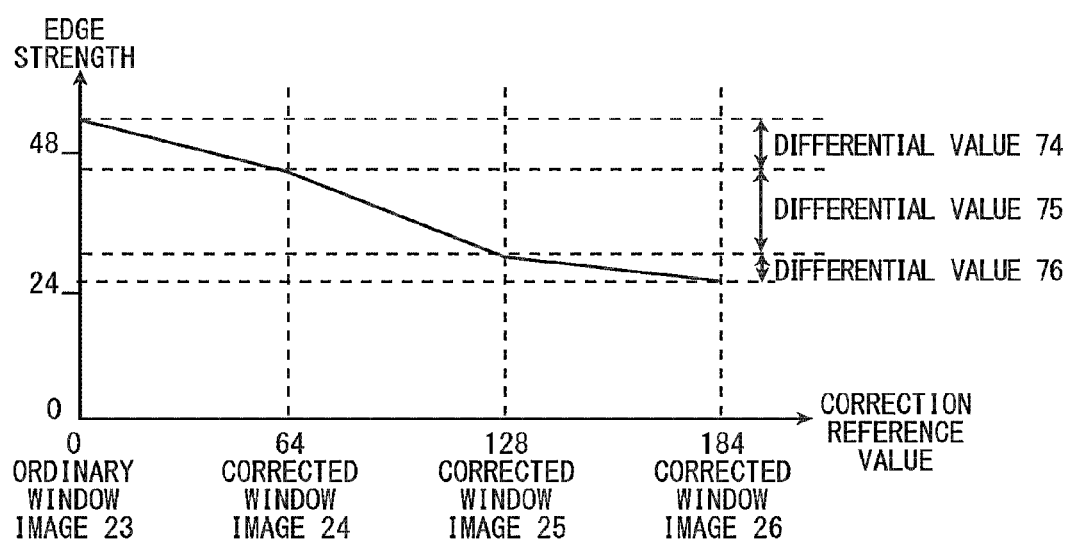
FIG. 17B is a graph showing a change in the edge strength shown in FIG. 17A.

FIG. 17A is a view showing the window images 23 to 26 corresponding to the window 54, respective edge strengths of the window images 23 to 26, and respective identification values 30 calculated from the window images 23 to 26. FIG. 17B is a graph showing a change in the edge strength among the window images of the window 54.

As shown in FIGS. 17A and 17B, the respective edge strengths of the window images decrease as the correction reference value and the zero reference value become larger. In the window 54, the differential value 75 is largest among the differential values 74 to 76. For calculation of the differential value 75, the edge strength of the corrected window image 24 and the edge strength of the corrected window image 25 are used. The corrected window image 25 having a smaller edge strength among the respective edge strengths of the corrected window images 24 and 25 is selected as the window image to be used for calculation of the identification value 30, As shown in FIG. 17A, in the window 54, the identification value 30 calculated from the corrected window image 25 is smaller as compared with the identification values 30 calculated from the other window images. Thus, by specifying the corrected window image 25 as the window image to be used for calculation of the identification value 30 on the basis of the differential values 74 to 76 and calculating the identification value 30 from the corrected window image 25, it is possible to improve the determination accuracy of whether or not there is a pedestrian in the window 54.

As described above, the object detection apparatus 2 sets the windows and extracts the ordinary window image 23 therefrom. The object detection apparatus 2 generates the corrected window images 24 to 26 from the ordinary window image 23 under different conditions and calculates the edge strengths of the window images 23 to 26. The object detection apparatus 2 arranges the window image 23 to 26 in decreasing order of edge strength and calculates the differential value of the edge strengths of the two adjacent window images. As a result, a plurality of differential values are generated. The object detection apparatus 2 specifies the largest differential value among the plurality of differential values and specifies a smaller edge strength among the two edge strengths used for calculation of the specified differential value. Then, the object detection apparatus 2 determines the window image having the specified edge strength as the window image to be used for calculation of the identification value 30. The object detection apparatus 2 calculates the identification value 30 from the window image which is determined to be used for the calculation and determines whether or not there is a pedestrian in the window on the basis of the identification value 30. It is thereby possible to improve the detection accuracy of a pedestrian.

Though the case where the correction reference value and the zero reference value are fixed has been described in the above-described second embodiment, the present invention is not limited to this. The correction reference value and the zero reference value used for generation of the corrected window image may be changed in accordance with the feature amount of the captured image 21. For example, the correction reference value and the zero reference value may be changed from the values shown in FIG. 13 in accordance with an integrated value of luminance values of the captured image 21. Even in this case, the window image to be used for calculation of the identification value 30 can be selected in the same procedure as that in the above-described embodiment. Alternatively, the object detection apparatus 2 may calculate a rate of change in the edge strength with respect to the zero reference value and select the window image to be used for calculation of the identification value 30.

Further, though the case where the selection unit 62 selects the window image having a smaller edge strength among two edge strengths used for calculation of the largest differential value as the object window image to be used for calculation of the identification value 30 has been described in the above-described second embodiment, the present invention is not limited to this. The selection unit 62 may select the window image having a larger edge strength among two edge strengths as the object window image to be used for calculation of the identification value 30. In this case, in the window 52, the ordinary window image 23 among the window images 23 to 26 is selected to be used for calculation of the identification value 30.

Though the case where the average value of the pixel value per one pixel is used as the edge strength of each window image has been described in the above-described embodiments, the present invention is not limited to this. For example, a value (edge strength sum value) obtained by integrating the pixel values of the pixels in the window image may be used as the feature amount of each window image.

Alternatively, as the feature amount of the ordinary window image 23, a ratio between the strength of an edge extending in the transverse direction and that of an edge extending in the longitudinal direction may be used. Specifically, as the ordinary window image 23, generated are a window image in which an edge extending in the transverse direction is enhanced and another window image in which an edge extending in the longitudinal direction is enhanced. Then, the strength of the edge extending in the transverse direction may be obtained by integrating the pixel values of the pixels in the window image in which the edge extending in the transverse direction is enhanced, and the strength of the edge extending in the longitudinal direction may be obtained by integrating the pixel values of the pixels in the window image in which the edge extending in the longitudinal direction is enhanced.

Though the case where the edge image generation unit 11 performs the process to enhance the edges in the vertical and horizontal directions on the gray scale image has been described in the above-described embodiments, the present invention is not limited to this. The edge image generation unit 11 may perform a process to enhance the edges in directions other than the vertical and horizontal directions (for example, the diagonally right upward direction and the diagonally left upward direction).

Though the case where the window setting unit 12 sets the window on the edge image 22 has been described in the above-described embodiments, the present invention is not limited to this. In FIG. 1, the edge image generation unit 11 and the window setting unit 12 may be interchanged with each other. In this case, the window setting unit 12 sets the windows on the gray scale image generated from the captured image 21. The edge image generation unit 11 performs the edge enhancement process on the window extracted from the gray scale image, to thereby generate the ordinary window image 23.

Though the case where the identification value calculation unit 16 calculates the identification value 30 by using the neural network has been described in the above-described embodiments, the present invention is not limited to this. The identification value calculation unit 16 may calculate the identification value 30 by using an algorithm other than the neural network. For example, a support vector machine or the like may be used.

Though the case where the determination unit 17 determines whether or not there is a pedestrian inside the window 52 on the basis of the identification value 30 calculated by the identification value calculation unit 16 has been described in the above-described embodiments, the present invention is not limited to this. The object detection apparatuses 1 and 2 may not include the determination unit 17 and may output the identification value 30. In this case, a post-processing unit provided in a post stage of the object detection apparatuses 1 and 2 may determine whether or not there is a pedestrian in the captured image 21 (see FIG. 4) on the basis of the identification value 30. For example, on the basis of a spatial distribution of a plurality of identification values 30 calculated from the window images set in the captured image 21 shown in FIG. 4, whether or not there is a pedestrian in the captured image 21 or the position of a pedestrian, and the like may be specified.

Though the case where the pixel value correction unit 13 changes the pixel value to 0 in the generation of the corrected window image 24 when the pixel value of the ordinary window image 23 is smaller than the zero reference value 34b has been described in the above-described embodiments, the present invention is not limited to this. The pixel value correction unit 13 may use a reference value (second correction reference value) which is larger than 0 and smaller than the correction reference value 34a, instead of the zero reference value 34b. In this case, the gradient of a straight line (reference straight line) from the original point to the inflection point 56B in the solid line 56 shown in FIG. 8 is larger than 0 and smaller than 1. When the pixel value of the ordinary window image 23 is smaller than the second correction reference value, the pixel value is corrected on the basis of the correspondence between the pixel value before correction and the pixel value after correction which are determined in accordance with the reference straight line. Also in the case of generation of the corrected window images 25 and 26, the same processing may be performed.

Alternatively, in generation of the corrected window image 24, the pixel value correction unit 13 may correct a pixel value smaller than the second correction reference value to the second correction reference value. In this case, the minimum pixel value of the corrected window image 24 is changed from 0 to the second correction reference value. Also in the case of generating the corrected window image 25 and 26, the same processing may be performed.

In the object detection apparatuses 1 and 2 described in the above embodiments, the function units may be individually made into one chip by using a semiconductor device such as an LSI or some or all of the function units may be made into one chip. The technique for integration into a circuit is not limited to the LSI circuit technology, but may be implemented by a dedicated circuit or a general-purpose processor. An FPGA (Field Programmable Gate Array) which allows programming after manufacturing an LSI or a reconfigurable processor capable of reconfiguring interconnection and setting of circuit cells inside an LSI may be used.

Further, some or all of the processings of the functional blocks in the above-described embodiments may be implemented by programs. Then, some or all of the processings of the functional blocks in the above-described embodiments are executed by a CPU in a computer. The programs used for performing the processings are stored in a memory device such as a hard disk, a ROM, or the like and executed in the ROM or after being read out to the RAM.

Furthermore, the processings in the above-described embodiments may be implemented by hardware or by software (including OS (Operating System), middleware, or implementation together with a predetermined library). Further, the processings may be implemented by mixture of hardware and software.

A computer program which causes a computer to execute the above-described method and a computer-readable recording medium storing the program are included in the scope of the present invention. Herein, as the computer-readable recording medium, for example, a flexible disk (floppy disk), a hard disk, a CD-ROM, an MO, a DVD, a DVD-ROM, a DVD-RAM, a BD (Blu-ray Disc), a semiconductor memory may be used.

The above-described computer program is not limited to be recorded in the above-described recording medium, but may be transmitted via a telecommunications line, a wireless or wired communication line, a network such as the internet, or the like.

The term "unit" may be a concept that includes "circuitry". The circuitry may be embodied wholly or in part as software, hardware, or any combination thereof While the invention has been shown and described in detail, the foregoing description is in all aspects illustrative and not restrictive. It is therefore understood that numerous modifications and variations can be devised without departing from the scope of the invention.

What is claimed is:

1. An object detection apparatus for detecting an object to be detected from a frame image, comprising:
  circuitry configured to:
  set a window to be used for detection of the object to be detected in the frame image and acquire a first window image having an image of the window;
  generate second window image by acquiring a value smaller than a pixel value of a pixel inside the first window image acquired by the circuitry when the pixel value is smaller than a correction reference value;
  calculate a feature amount of the second window image generated by the circuitry;
  determine whether or not to use the second window image for calculation of an identification value indicating whether or not the object to be detected is present in the window based on the feature amount calculated by the circuitry; and
  calculate the identification value indicating a degree of presence of the object to be detected inside the second window image by using feature data of the object be detected when the circuitry determines to use the second window image.

2. The object detection apparatus according to claim 1, wherein the circuitry is further configured to:
  compare the pixel value of the pixel inside the first window image with a reference value different from the correction reference value when the circuitry determines not to use the second window image, and generate a third window image by acquiring a value smaller than the pixel value when the pixel value is smaller than a difference reference value;
  calculate a feature amount of the third window image generated by the circuitry;
  determine whether or not to use the third window image based on the feature amount of the third window image, which is calculated by the circuitry; and
  calculate an identification value indicating a degree of presence of the object to be detected inside the third window image when the circuitry determines to use the third window image.

3. The object detection apparatus according to claim 1, wherein the circuitry is further configured to:
  calculate a feature amount of the first window image;
  determine whether or not to use the first window image based on the feature amount of the first window image, which is calculated by the circuitry;
  calculate an identification value indicating a degree of presence of the object to be detected inside the first window image when the circuitry determines to use the first window image; and generate the second window image when the circuitry determines not to use the first window image.

4. The object detection apparatus according to claims 1, wherein the frame image is an edge image,
the feature amount of the second window image is an edge strength, and
the circuitry is further configured to determine to use the second window image when the feature amount of the second window image is smaller than a usage reference value which is set in advance.

5. The object detection apparatus according to claim 1, wherein the circuitry is further configured to:

compare the pixel value of the pixel inside the first window image with a first reference value which is larger than the correction reference value, and generate a third window image by acquiring a pixel value smaller than the pixel value when the pixel value is smaller than the first reference value;
calculate a feature amount of the third window image; and
select a window image to be used for calculation of the identification value out of the second window image and the third window image based on the feature amount of the second window image and the feature amount of the third window image.

6. The object detection apparatus according to claim 5, wherein the circuitry is further configured to:

calculate a feature amount of the first window image; and
select a window image to be used for calculation of the identification value out of the first to third window images based on the respective feature amounts of the first to third window images.

7. The object detection apparatus according to claim 6, wherein the circuitry is further configured to:

calculate a first differential value indicating a difference between the feature amount of the first window image and the feature amount of the second window image and a second differential value indicating a difference between the feature amount of the second window image and the feature amount of the third window image,
wherein the circuitry selects a window image to be used for calculation of the identification value out of the first to third window images based on the first differential value and the second differential value.

8. The object detection apparatus according to claim 7, wherein the circuitry is further configured to select the second window image when the first differential value is larger than the second differential value.

9. The object detection apparatus according to claim 5, wherein the circuitry is further configured to:

compare the pixel value of the pixel inside the first window image with a second reference value which is larger than the first reference value, and generate a fourth window image by acquiring a pixel value smaller than the pixel value when the pixel value is smaller than the second reference value;
calculate a feature amount of the fourth window image; and
select a window image to be used for calculation of the identification value out of the second to fourth window images based on the respective feature amounts of the second to fourth window images.

10. The object detection apparatus according to claim 1, wherein the frame image is an edge image, and
the circuitry is further configured to calculate an edge strength of the second window image as the feature amount of the second window image.

11. The object detection apparatus according to claim 1, wherein the circuitry is further configured to:

compare the pixel value of the pixel inside the first window image with a zero reference value which is smaller than the correction reference value;
acquire a value obtained by replacing the pixel value with zero when the pixel value is smaller than the zero reference value; and
acquire a value obtained by replacing the pixel value with a value larger than zero when the pixel value is not smaller than the zero reference value and smaller than the correction reference value.

12. A non-transitory computer-readable recording medium storing an object detection program for causing a computer included in an object detection apparatus for detecting an object to be detected from a frame image to execute the steps of:

setting a window to be used for detection of the object to be detected in the frame image and acquiring a first window image having an image of the window;
generating a second window image by acquiring a value smaller than a pixel value of a pixel inside the first window image when the pixel value is smaller than a correction reference value;
calculating a feature amount of the second window image;
determining whether or not to use the second window image for calculation of an identification value indicating whether or not the object to be detected is present in the window based on the feature amount of the second window image; and
calculating the identification value indicating a degree of presence of the object to be detected inside the second window image by using feature data of the object to he detected when it is determined to use the second window image.

* * * * *